May 19, 1964 M. A. MOSKOVITZ 3,133,578
SELF-LOCKING BOLT
Filed Oct. 26, 1962
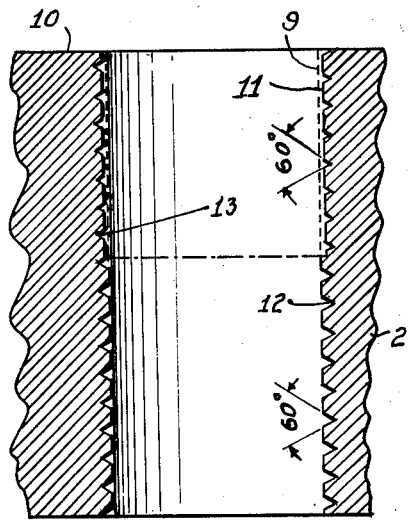
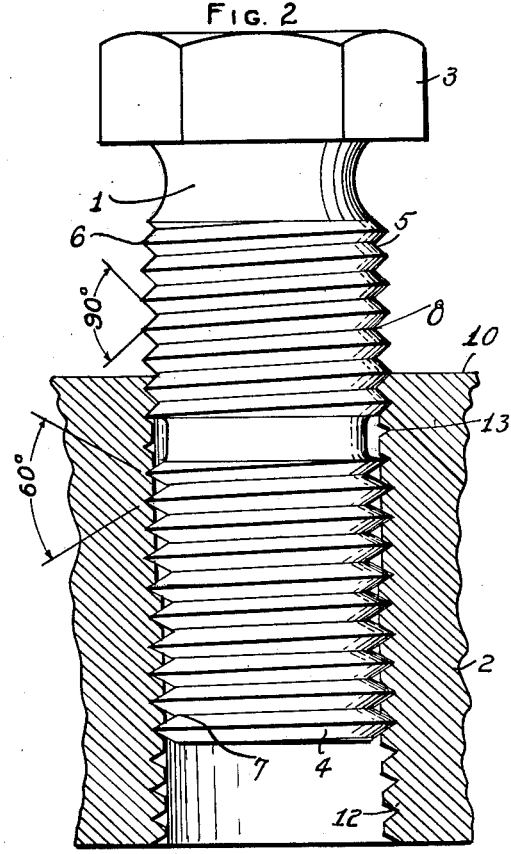
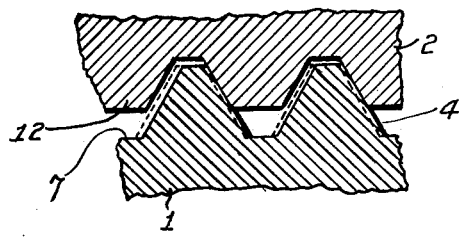
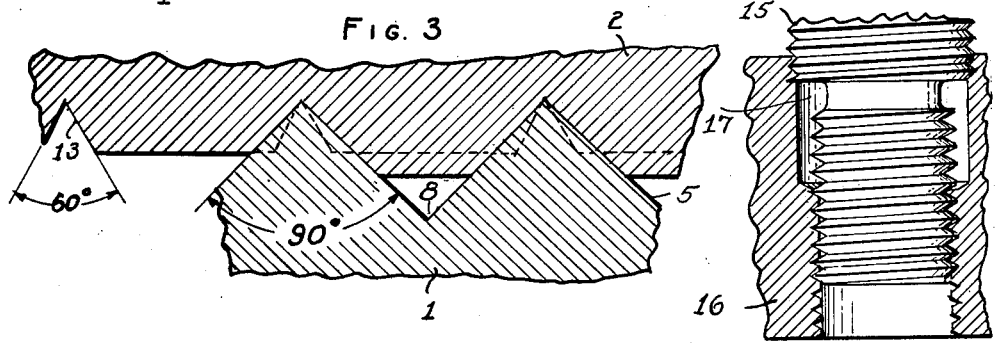
INVENTOR.
MILTON A. MOSKOVITZ
BY:
ATTORNEY

United States Patent Office 3,133,578
Patented May 19, 1964

3,133,578
SELF-LOCKING BOLT
Milton A. Moskovitz, 8531 Antler Drive,
St. Louis 17, Mo.
Filed Oct. 26, 1962, Ser. No. 234,012
3 Claims. (Cl. 151—22)

This invention relates to self-locking threaded devices, and more especially to an externally threaded bolt or screw that has a pair of axially spaced-apart thread series thereon, with the threads of one such series being shaped differently from those of the other series, the screw being insertible into a cooperating internally threaded member to adjustably maintain said members interlocked. This application is a continuation-in-part of my application Serial No. 592,611, now abandoned.

One of the principal objects of my invention is to so construct one of said members with all of its threads of a uniform and constant pitch, but with some of the threads of a configuration that is different from other threads thereon.

Another object of the invention is to so construct such a threaded bolt that it can be adjusted forwardly as well as rearwardly relative to its companion member, and firmly and efficiently hold said parts together in all such adjustments.

An added object of the invention is to so construct said adjustable threaded locking member with two sets of threads, one such set having the threads with a thread angle that is different from the threads of the second set, but maintaining the pitch of all threads uniform and constant.

A further object of my invention is to so construct such a bolt that its major diameter of its two sets of threads are substantially alike, but with the minor diameter of the threads of one set being different from the minor diameter of those of its other set.

Still another object of the invention is to so construct two cooperating threaded members that said internally threaded member will have all of its threads with a like thread angle, and the insertible externally threaded second member will have a forward portion with entrance threads having the same thread angle as that of said internally threaded member, while the follower portion of said insertible member will have threads with a greater thread angle, so that as the second member is rotatably advanced into the first member, said entrance threads act as a lead screw and said follower threads will deform or compact the threads of the first member to substantially the shape of said follower threads as it advances through the latter.

Many other objects and advantages of the construction herein shown and described will be obvious to those skilled in the art to which this invention appertains, as will be apparent from the following disclosure.

To this end, my invention consists in the novel form, arrangement, construction and combination herein shown and described, all as will be more clearly hereinafter pointed out.

In the drawings, wherein like reference characters represent like or corresponding parts throughout the views, FIGURE 1 is a fragmentary cross-sectional detail of an internally threaded member;

FIGURE 2 is a view, partly in elevation and partly in cross-section, through said adjustably interconnected members;

FIGURE 3 is an enlarged detail view, showing in cross-section, the deforming of the threads of one member as the follower threads of the other member advances therethrough;

FIGURE 4 is an enlarged cross-sectional detail, showing two positions of engagement between the engaging threads of the cooperating members; and FIGURE 5 is a view, somewhat similar to that shown in FIG. 2, of a modified form of interlocking members.

Referring more particularly to the drawings, wherein I have illustrated preferred embodiments of my invention, I have shown a bolt or screw 1 for adjustable self-locking interengagement with an internally threaded second member, as for example a nut or the like. There are many instances in mechanical constructions wherein it is necessary to employ bolts or screws adjustably interlocking with a second member, as for instance the use of a tap screw threadably engageable through a valve rocker arm to control the angular movement of the latter. Sometimes, the screw must be adjustably advanced, and sometimes retracted, but it is highly important that said adjustments be made conveniently and easily, and that the parts will not accidentally shift out of their desired adjusted relationship, even though the parts may meet with shock or vibration.

One of this pair of cooperatingly threaded members, as for example the bolt member 1, has its threads formed in any method, as by rolling or the like, and may have a longitudinally extending shank portion provided at one end with a head 3 or other means for forcibly rotating the member through the second member.

It is to be noted that this member 1 has two distinct sets or series of threads thereon, one such set of threads 4 constituting entrance or starter threads and completely separated longitudinally from the other or follower threads 5, so that only after all of the starter threads have engaged the cooperating internal threads of the member 2, will said follower threads enter and threadedly engage in said member 2.

In the form shown in the drawings, all threads of said member 1 have the same pitch, with the two series being separated an amount that is a multiple of the said pitch, the separation indicated being twice the pitch (see FIGS. 2 and 5), and the thread angle of the starter or entrance threads 4 being less than that of the follower threads 5. In the form shown, the thread angle of the starter threads are made 60°, while the angle of the follower threads is greater, namely 90°.

Also, in the modification shown in FIGS. 1-4 inclusive, all of the threads of the member 1 have the same maximum diameter, as indicated at 6, and it is again repeated that the pitch of the screw is uniform and constant throughout its length. However, the minor or root line diameter 7 of the threads that compose the starter set is less than the corresponding diameter 8 of the follower set of threads. The starter thread angle is that of normal threads made according to any recognized thread standard, as for instance the 60° standard used in the United States, while the thread angle of the follower threads is not standard or of normal shape, but is for instance made at a 90° angle. As hereinbefore mentioned, all of the standard, as well as the other threads, may be readily formed by any suitable process, as for instance, by rolling.

The second member 2 may have its screw-receiving opening formed in a suitable manner, as by first boring a hole of minimum diameter as indicated in dotted lines 9, boring inwardly from the entrance face 10. Next, a counterbore 11 is made inwardly from said face for a predetermined distance, and it is preferred that the depth of this counterbore, measured inwardly from said face 10, be less than the axial distance from the foremost starter thread 4 to the foremost of the follower threads 5, for a reason to be set forth hereinafter.

The counterbore, indicated in FIGS. 1-4 inclusive, is of a diameter not greater than the major diameter of the starter threads of the member 1, so that a tap having normal or standard cutters is run through said bored and counterbored portions in sequence. Threads will be formed internally along the length of said hole to form the series or set of threads 12 toward the innermost end of said hole, as measured from said face 10, and form the second series of threads 13 adjacent the axially outermost portion of said member 2. Inasmuch as the diameter of said counterbore is greater than that of said initial bore, the threads 12 will be deeper or fuller than the other or shallow threads 13. As a matter of fact, the diametral size of the counterbore may be made sufficiently large to be entirely in excess of the maximum cutting diameter of the tap to be used, so that the tap will not cut any threads at all in such enlarged counterbored portion (see FIG. 5).

There is usually a predetermined amount of play or clearance between male and female cooperating threaded parts, and this tolerance relationship enables the relatively easy rotational advancement of the screw or bolt through its mating member, until such time as the foremost follower thread of the screw member engages the nearest shallow thread of the female member.

Now, further rotational advancement of the screw brings said foremost follower thread into cutting relation with the female member. Continued forward feeding of this screw, with a wrench or the like, causes its follower threads to cut their way into said mating member to form a thread in the latter that accurately conforms to the general shape of said follower threads.

During this driving advance of the screw, after its foremost follower thread is in engagement with the nearest adjacent thread 9 of the female member, there is a frictional resistance to such advancement set up, and such resistance against the advancing face of its follower thread of the screw will force the screw rearwardly to thus take up normal clearance between the rear or trailing faces of the mating threads, as indicated more clearly in FIG. 4, wherein the dotted lines indicates the normal engagement of the screw in the female member and the clearance therebetween, while the full lines indicates the position of the mating parts after the follower threads of the screw begin their cutting or deforming action with the female member, this shifting of the screw rearwardly moving its forward thread as shown. Thus, said starter threads continue to act somewhat as a lead screw and enables the follower threads to drivingly enter into the shallow threads of the internally threaded member.

The metal of the threaded area of the female member is so deformed by the follower threads that it flows to conform substantially to the shape of the male threads, as hereinbefore mentioned.

Thus, thereare two sources of frictional engagement to hold the screw adustably in the female member, the frictional engagement (indicated by the full-line position of engaging threads) of the starter threads augmenting the frictional engagement between the follower threads and the threads as shaped by the latter, so that when such a screw or bolt is used with a female member as set forth, there is formed a self-locking interconnection that can be used in any application requiring such an interrengagement. Such a bolt can be inserted and removed any number of times, insuring good self-lockingability, as the elasticity of the material used will tend to sufficiently partly return to its original shape and permit of repeated adustment of the parts, either forwardly or backwardly as required.

Referring to FIG. 5, the follower threads 15 of the bolt have their thread angle and their major diameter greater than the corresponding sizes of the starter or entrance threads of said bolt, so that when the bolt is advanced rotatably through the cooperating second member 16, the threads 15 will act somewhat as a tap to produce their own thread shape in said counterbored portion 17 of said second member.

Also, in the structure shown in FIG. 5, the pitch of the follower threads may be larger, smaller or of same size as the pitch of the starter threads, as preferred, and in each instance the starter threads will act as a lead screw and shift from the dotted-line position to the full-line position indicated in FIG. 4 as soon as said follower threads commence their cutting or thread-shaping action on the member 16.

In both modifications shown, however, it is preferred that the thread angle of the starter threads of the bolt be less than that of its follower threads.

In summary, the present invention relates to a self-locking bolt including or for association with a female member 2 having a cylindrical bore 9 (FIG. 1) extending therein from the entrance face 10. Female member 2 has a first cylindrical bore section 11 proximate the face 10 and a second cylindrical section (at the threads 12) remote from the face 10. The second section has a thread 12 therein the minor diameter of which is smaller (in the modification of FIGS. 1 and 2) than the minor diameter of the threads 13 of the first section, and which is smaller (in the modification of FIG. 5) than the minimum diameter of the initially unthreaded first section 17.

A male member 1, for threaded cooperation with the female member 2, has a cylindrical starter portion having a thread 4 and a cylindrical follower portion having a thread 5 and spaced axially from the starter portion. The thread 4 of the starter portion has the same pitch and thread angle as the thread 12 of the second section of the female member, and the thread 4 further has a minor diameter which is substantially less than the minimum diameter of the upper or first section of the female member prior to insertion of the male member 1 in the female member 2. The starter thread 4 is movable through the upper or first section of the female member (by rotation in the embodiment of FIGS. 1 and 2 and by simple translation in the embodiment of FIG. 5) into threaded engagement with the thread 12 of the second section. The thread 4 of the starter portion of the male member and the thread 12 of the second section of the female member both have a relatively small thread angle to provide a substantial depth of engagement therebetween, that is, the longitudinal projection of the mating areas between the following flank of the thread 4 and the abutting face of the female thread 12 are quite substantial so that substantial longitudinal forces can be developed without stripping those threads. The thread 4 of the starter portion of the male member engages thread 12 prior to the engagement of thread 5 of the follower portion with the thread of the upper or first section of the female member and is effective upon rotation of the male member 1 (and upon engagement of thread 4 with thread 12) to exert a force on the threaded follower (upper) portion of the male member axially of that male member and in a direction toward the lower female section. That is, when thread 4 is screwed into thread 12, the upper or follower portion of the male member is pulled downwardly.

The thread 5 of the threaded follower (upper) portion of the male member has the same thread pitch as the thread 4 of the starter portion but has a larger thread angle, a larger pitch diameter, and a larger minor diameter than the starter portion thread 4 so that the threaded follower portion will self-tappingly and intimately engage the first (upper) section of the female member and form a substantial conforming thread therein when the aforesaid axial force is exerted on the threaded follower portion as a result of the engagement of the starter thread 4 with the thread 12. The follower thread 5 has a relatively large thread angle (large relative to the thread angle of the starter portion, as above indicated) to provide a lesser depth of engagement (less than the depth of engagement between threads 4 and 12) between the follower thread 5 and the first section thread 13. In this fashion, the establishment of self-tapping engagement between the threads 5 and 13 is facilitated in that the greater depth of engagement between threads 4 and 12 insures that sufficient force can be developed by those threads to pull the self-tapping threads 5 into self-tapping engagement with the first (upper) section of the female member. This self-tapping engagement may occur between the thread 5 and partially formed threads 13 (FIGS. 1 and 2) or the thread in the upper section of the female member may be completely self-tapped as shown in FIG. 5. In either case, the minor diameter of the follower portion threads 5 is substantially less than the minimum diameter of the first or upper female section prior to the self-tapping engagement of the follower threads 5 therewith.

In the formation of the full thread in the upper female section due to the self-tapping engagement therewith of thread 5, substantially all of the material of the upper female section which is displaced by thread 5 during the self-tapping operation is moved into the area between the turns of the thread 5 as distinguished from a situation in which the mass of displaced material is extruded ahead of the follower portion.

By virtue of this arrangement, the intimate engagement between the follower thread 5 and the self-tapped conforming thread of the upper female section serves to force the following (upper) flank of the starter thread 4 into intimate frictional engagement with the abutting face of the female thread 12, to provide, in cooperation with the intimate engagement between the follower thread 5 and the upper female section thread, the high-friction self-locking engagement which is desired.

The insertion of the bolt is terminated while the follower thread 5 is still spaced from the thread 12 in the lower section of the female member.

The pitch diameter of the follower thread is larger than the pitch diameter of the starter thread if the two threads is equal.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In combination, a female member having a bore extending therein from one face thereof having a first cylindrical section proximate said face and a second cylindrical section remote from said face, said second section having a thread therein the minor diameter of which is smaller than the minimum diameter of said first section, and a male member for threaded cooperation with said female member and having a cylindrical threaded starter portion and a cylindrical threaded follower portion spaced axially from and having substantially the same major diameter as said starter portion, the thread of said starter portion having the same pitch and thread angle as the thread of said second section and having a minor diameter substantially less than the minimum diameter of said first section prior to insertion of said male member in said female member, said starter portion being movable through said first section into threaded engagement with said threaded second section, said thread of said starter portion and the thread of said second section both having a relatively small thread angle, the distance between the leading end of the thread of said starter portion and the leading end of the thread of said follower portion being greater than the depth of the first cylindrical section, said threaded starter portion engaging said second section prior to engagement of said follower portion with said first section and being effective on rotation of said male member and engagement of said thread of said starter portion with said second section to exert a force on said threaded follower portion axially of said male member and in a direction towards said second section, said first cylindrical section being threaded with a partial thread prior to the engagement of said follower portion therewith, said partial thread being of substantially the same pitch as the thread of said second section and of said male member, said threaded follower portion having the same thread pitch as said starter portion and having a larger thread angle and minor diameter than said starter portion to self-tappingly and intimately engage said first section and form a substantially conforming thread therein when said male member is rotated and when said axial force is exerted on said threaded follower portion by said threaded starter portion, said thread of said follower portion having a relatively large thread angle to facilitate said self-tapping engagement therebetween, the minor diameter of said threaded follower portion being substantially less than the minor diameter of the partial thread of said first section prior to the self-tapping engagement of said follower portion with said first section, substantially all of the material of said first section displaced by said threaded follower portion during the self-tapping engagement thereof being moved into the area between the thread turns of said follower portion, the intimate engagement between the thread of said follower portion and said conforming thread of said first section forcing the following flank of said thread of said starter portion into intimate frictional engagement with the abutting face of said thread of said second section, said follower portion being spaced from said second section when said starter portion of said male member is threadedly engaged with said second section of said female member.

2. In combination, a female member having a bore extending therein from one face thereof having a first cylindrical section proximate said face and a second cylindrical section remote from said face, the maximum diameter of said first section being larger than the maximum diameter of said second section, said second section having a thread therein the minor diameter of which is smaller than the minimum diameter of said first section, and a male member for threaded cooperation with said female member and having a cylindrical threaded starter portion and a cylindrical threaded follower portion spaced axially from said starter portion, the major diameter of the thread on said follower portion being larger than the major diameter of the thread on said starter portion, the thread of said starter portion having the same pitch and thread angle as the thread of said second section and having a minor diameter substantially less than the minimum diameter of said first section prior to insertion of said male member in said female member, said first section being unthreaded prior to insertion of said male member and having a minimum diameter prior to such insertion larger than the minor diameter of the thread of said follower portion and larger than the major diameter of the thread of said starter portion but smaller than the major diameter of the thread of said follower portion, said starter portion being movable through said first section into threaded engagement with said threaded second section, said thread of said starter portion and the thread of said second section both having a relatively small thread angle, the distance between the leading end of the thread of said starter portion and the leading end of the thread of said follower portion being greater than the depth of the first cylindrical section, said threaded starter portion engaging said second section prior to engagement of said follower portion with said first section and being effective on rotation of said male member and engagement of said thread of said starter portion with said second section to exert a force on said threaded follower portion axially of said male member and in a direction towards said second section, said threaded follower portion having the same thread pitch as said starter portion and having a larger thread angle and minor diameter than said starter portion to self-tappingly and intimately engage said first section and form a substantially conforming thread therein when said male member is rotated and when said axial force is exerted on said threaded follower portion by said threaded starter portion, said thread of said follower portion having a relatively large thread angle to facilitate and self-trapping engagement therebetween, the minor diameter of said threaded follower portion being substantially less than the minimum diameter of said first section prior to the self-tapping engagement of said follower portion with said first section, substantially all of the material of said first section displaced by said threaded follower portion during the self-tapping engagement thereof being moved into the area between the thread turns of said follower portion, the intimate engagement between the thread of said follower portion and said conforming thread of said first section forcing the following flank of said thread of said starter portion into intimate frictional engagement with the abutting face of said thread of said second section, said follower portion being spaced from said second section when said starter portion of said male member is threadedly engaged with said second section of said female member.

3. In combination, a female member having a bore extending therein from one face thereof having a first cylindrical section proximate said face and a second cylindrical section remote from said face, the maximum diameter of said first section being larger than the maximum diameter of said second section, said second section having a thread therein the minor diameter of which is smaller than the minimum diameter of said first section, and a male member for threaded cooperation with said female member and having a cylindrical threaded starter portion and a cylindrical threaded follower portion spaced axially from said starter portion, the major diameter of the thread on said follower portion being larger than the major diameter of the thread on said starter portion, the thread of said starter portion having the same pitch and thread angle as the thread of said second section and having a minor diameter substantially less than the minimum diameter of said first section prior to insertion of said male member in said female member, said first section being partially threaded prior to insertion of said follower portion therein with a thread having a thread angle smaller than the thread angle of said follower portion, the partial thread of said first portion prior to the insertion of said follower portion having a minimum diameter larger than the minor diameter of the thread of said follower portion and larger than the major diameter of the thread of said starter portion but smaller than the major diameter of the thread of said follower portion, said starter portion being movable through said first section into threaded engagement with said threaded second section, said thread of said starter portion and the thread of said second section both having a relatively small thread angle, the distance between the leading end of the thread of said starter portion and the leading end of the thread of said follower portion being greater than the depth of the first cylindrical section, said threaded starter portion engaging said second section prior to engagement of said follower portion with said first section and being effective on rotation of said male member and engagement of said thread of said starter portion with said second section to exert a force on said threaded follower portion axially of said male member and in a direction towards said second section, said threaded follower portion having the same thread pitch as said starter portion and having a larger thread angle and minor diameter than said starter portion to self-tappingly and intimately engage said first section and form a substantially conforming thread therein when said male member is rotated and when said axial force is exerted on said threaded follower portion by said threaded starter portion, said thread of said follower portion having a relatively large thread angle to facilitate said self-tapping engagement therebetween, the minor diameter of said threaded follower portion being substantially less than the minimum diameter of said first section prior to the self-tapping engagement of said follower portion with said first section, substantially all of the material of said first section displaced by said threaded follower portion during the self-tapping engagement thereof being moved into the area between the thread turns of said follower portion, the intimate engagement between the thread of said follower portion and said conforming thread of said first section forcing the following flank of said thread of said starter portion into intimate frictional engagement with the abutting face of said thread of said second section, said follower portion being spaced from said second section when said starter portion of said male member is threadedly engaged with said second section of said female member.

References Cited in the file of this patent

UNITED STATES PATENTS

| 2,167,558 | Upson | July 25, 1939 |
| 2,360,826 | Cherry | Oct. 24, 1944 |
| 2,371,365 | Tomalis et al. | Mar. 13, 1945 |

FOREIGN PATENTS

| 413,027 | Great Britain | July 12, 1934 |